United States Patent
Tischler

[15] 3,638,999
[45] Feb. 1, 1972

[54] VEHICLE SEAT CONSTRUCTION
[72] Inventor: Henry J. Tischler, Bloomfield Hills, Mich.
[73] Assignee: Young Spring & Wire Corporation, Detroit, Mich.
[22] Filed: Dec. 17, 1969
[21] Appl. No.: 885,760

[52] U.S. Cl. .................................................297/379, 297/389
[51] Int. Cl. .......................................B60n 1/02, A62b 35/00
[58] Field of Search ...............297/379, 389, 386, 216, 385, 297/388

[56] References Cited

UNITED STATES PATENTS

| | | | |
|---|---|---|---|
| 2,864,432 | 12/1958 | Limberg | 297/379 |
| 2,873,794 | 2/1959 | Leslie | 297/379 |
| 3,028,198 | 4/1962 | Murr | 297/379 X |
| 3,292,744 | 12/1966 | Replogle | 297/388 X |
| 3,418,021 | 12/1968 | Lewis | 297/389 |
| 3,419,307 | 12/1968 | Strobush | 297/379 |
| 3,419,308 | 12/1968 | Apri | 297/389 X |
| 3,439,932 | 4/1969 | Lewis | 297/389 X |
| 3,442,529 | 5/1969 | Lewis | 297/388 X |

Primary Examiner—Francis K. Zugel
Attorney—Barnes, Kisselle, Raisch & Choate

[57] ABSTRACT

A vehicle seat construction comprising a seat back which is mounted for swinging movement between a generally upright position and a forward folded position with respect to a seat base. A seat lock assembly is provided that permits normal swinging movement of the seat back for ingress and egress to the area behind the seat back and is operable upon deceleration or impact on the vehicle to lock the seat back against forward swinging movement. A shoulder belt lock assembly is provided on the seat back and is operable to permit normal movement of the person seated on the vehicle and is further operable upon relative rapid movement of a seated person to lock the shoulder belt against movement with respect to the seat back.

15 Claims, 9 Drawing Figures

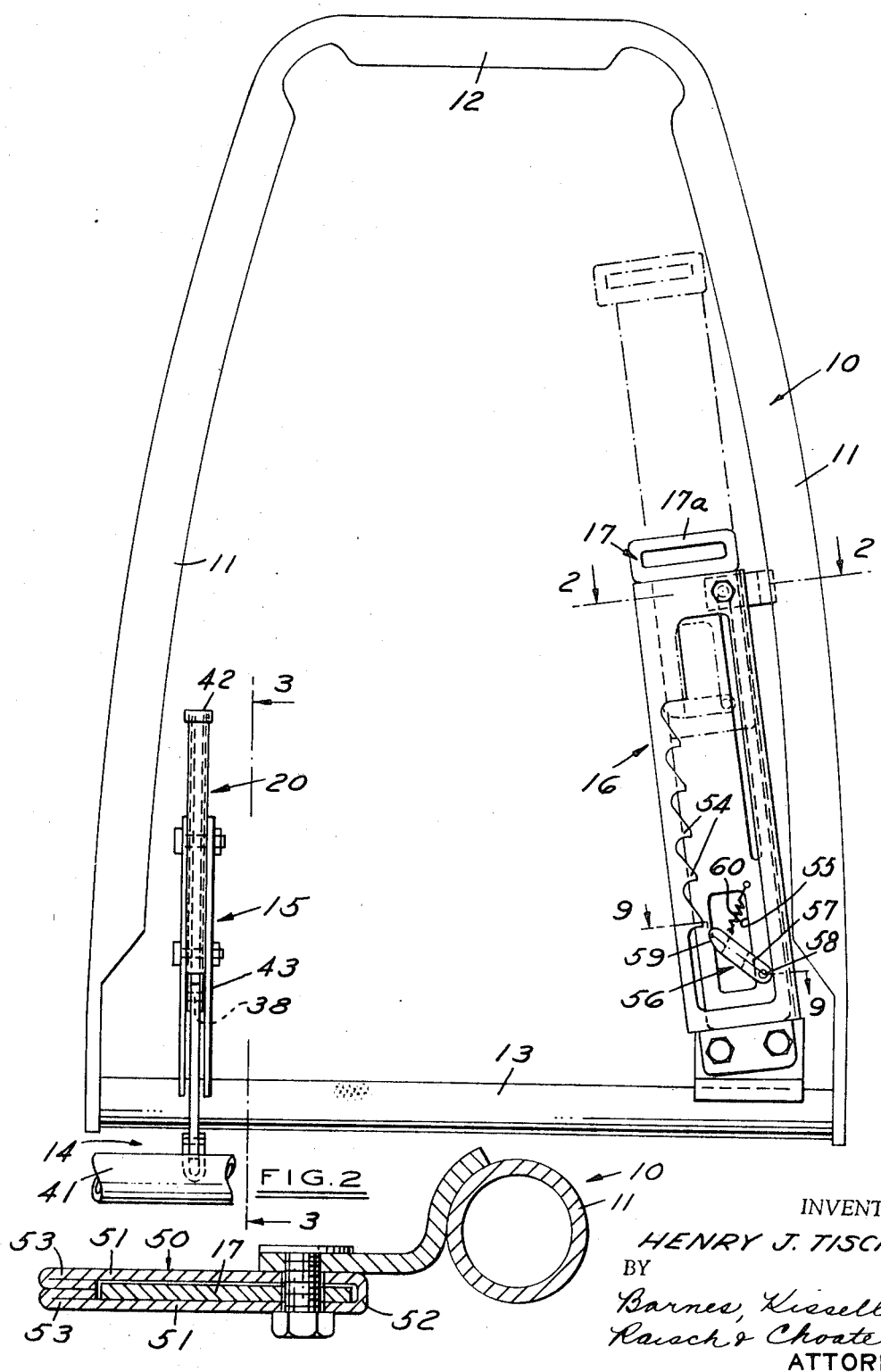

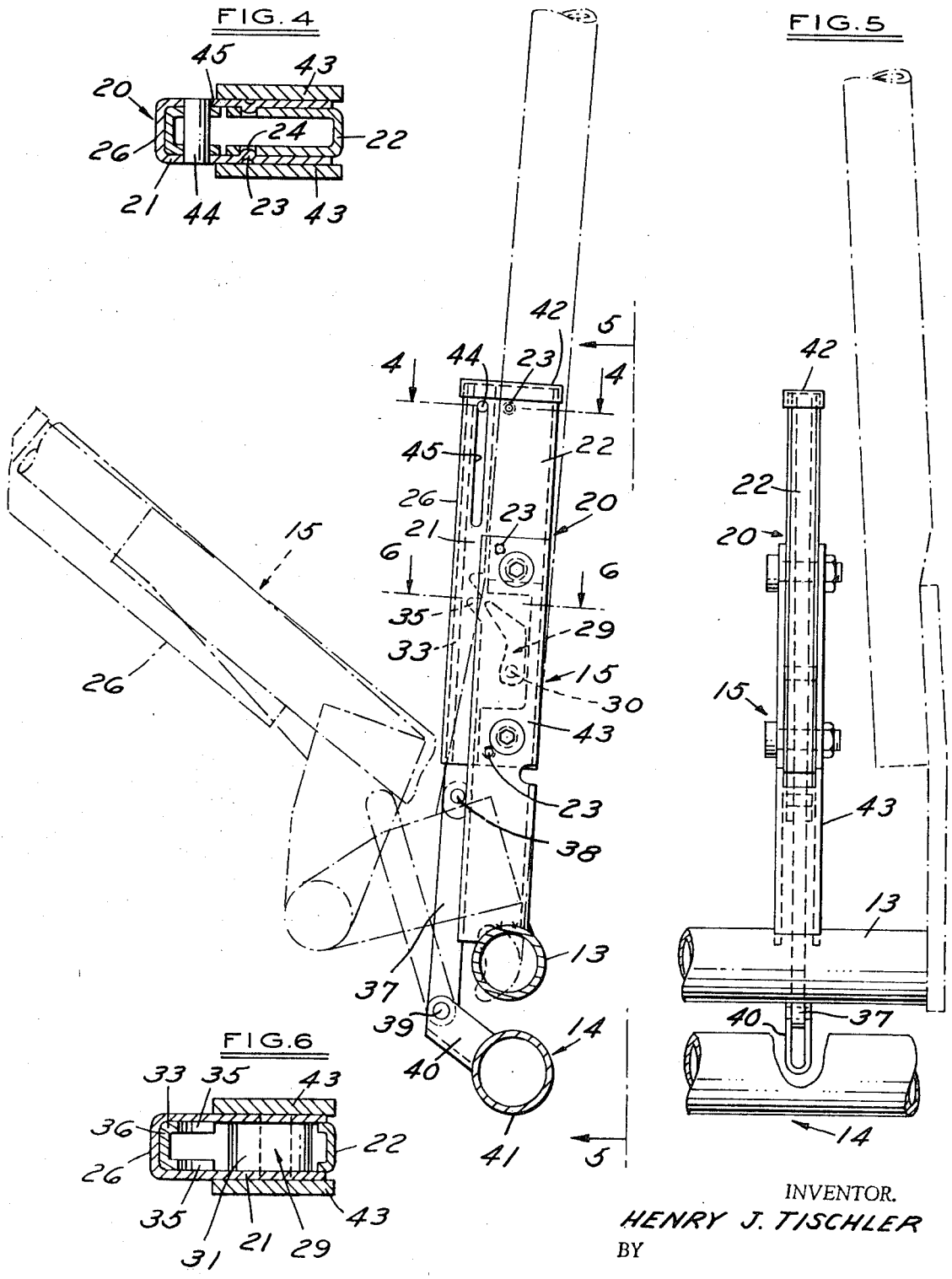

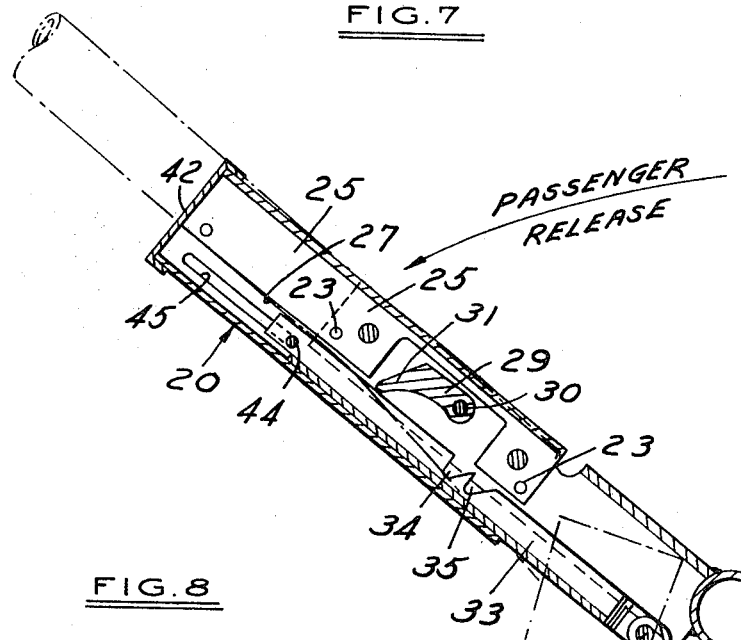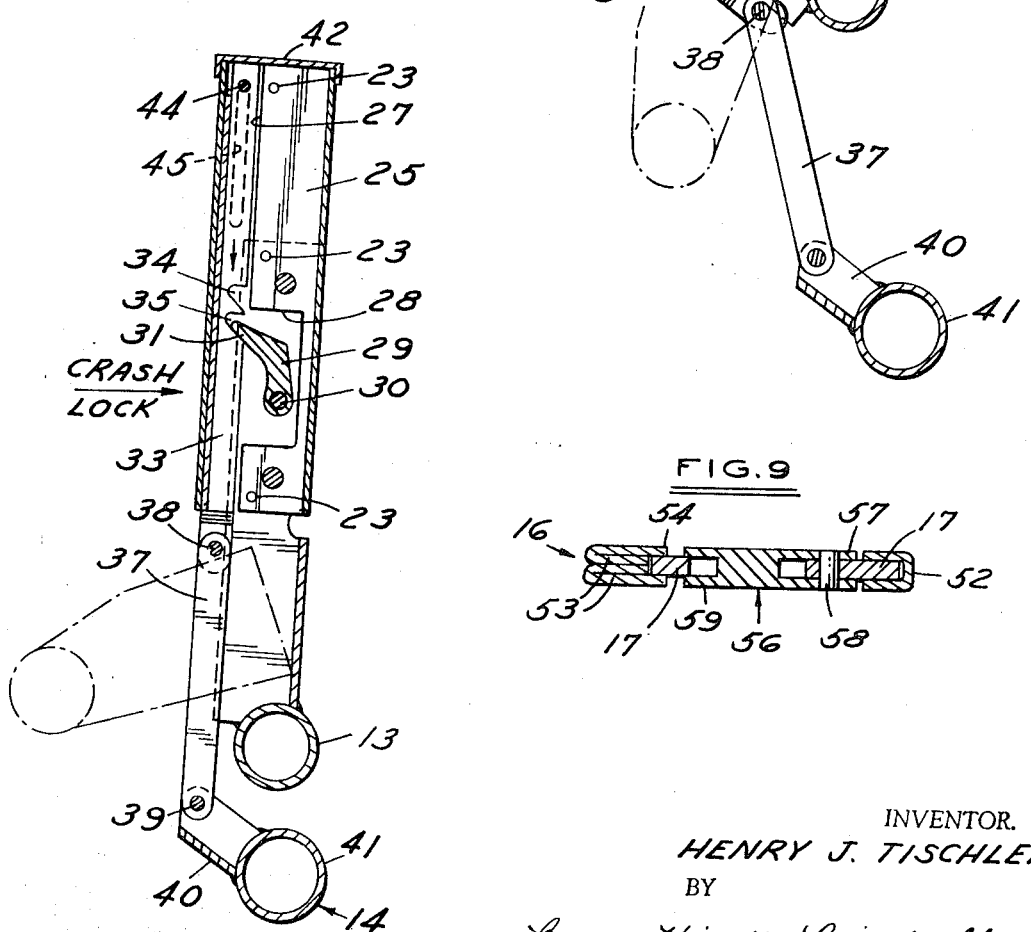

3,638,999

VEHICLE SEAT CONSTRUCTION

This invention relates to vehicle seat construction and particularly to a vehicle seat construction such as used in automotive vehicles wherein the seat back is mounted for movement between an upright position and a forward folded position to permit ingress and egress to the area behind the seat back and to vehicles having shoulder belts.

BACKGROUND OF THE INVENTION

In two-door vehicles and the like, it is customary for the seat back to be mounted for swinging movement between an upright position and a forward folded position to permit ingress and egress to the area behind the seat back. It has heretofore been suggested that a seat back lock be provided. In the majority of seat back locks heretofore provided, some manual operation is required in order to release the seat for folding movement. It is also customary in the vehicles for safety reasons to incorporate a shoulder strap that is fastened at opposite ends to the vehicle. Such shoulder straps normally do not permit movement of the person in the seat.

It is an object of the invention to provide a seat back construction wherein the seat back can move normally to permit ingress and egress to the area behind the seat and an occupant of the seat can move normally but wherein upon rapid deceleration or impact both the seat back is locked with respect to the seat base and the shoulder strap worn by the occupant is locked with respect to the seat.

It is a further object of the invention to provide a seat incorporating a seat back lock which does not require any manual operation but is operable automatically upon rapid deceleration or impact and yet permits swinging movement of the seat back under normal conditions.

It is a further object of the invention to provide an arrangement wherein shoulder strap lock assemblies provided on the seat back that normally permit normal movement of the person seated in the seat but is operable upon relative rapid movement of a seated person to lock the shoulder strap.

SUMMARY OF THE INVENTION

A vehicle seat construction comprising a seat back which is mounted for swinging movement between a generally upright position and a forward folded position with respect to a seat base. A seat lock assembly is provided that permits normal swinging movement of the seat back for ingress and egress to the area behind the seat back and is operable upon rapid deceleration or impact on the vehicle to lock the seat back against forward swinging movement. A shoulder belt lock assembly is provided on the seat back and is operable to permit normal movement of the person seated on the vehicle and is further operable upon relative rapid movement of a seated person to lock the shoulder belt against movement with respect to the seat back.

DESCRIPTION OF THE DRAWINGS

FIG. 1 is a fragmentary rear elevational view of a seat embodying the invention with the upholstery removed.

FIG. 2 is a sectional view on an enlarged scale taken along the line 2—2 in FIG. 1.

FIG. 3 is a fragmentary sectional view on an enlarged scale taken along the line 3—3 in FIG. 1.

FIG. 4 is a sectional view on an enlarged scale taken along the line 4—4 in FIG. 3.

FIG. 5 is a fragmentary front elevational view of the portion of the seat shown in FIG. 3.

FIG. 6 is a sectional view on an enlarged scale taken along the line 6—6 in FIG. 3.

FIG. 7 is a view similar to FIG. 3 showing the parts in section and in a different operative position.

FIG. 8 is a view similar to FIG. 3 showing the parts in section and in a different operative position.

FIG. 9 is a fragmentary sectional view taken along the line 9—9 in FIG. 1.

DESCRIPTION

Referring to FIG. 1, the vehicle seat construction embodying the invention comprises a tubular seat back 10 that includes side members 11, a top member 12 and a bottom member 13. The seat back 10 is hinged to a tubular base 14 by a hinge construction that is common in the art so that it is movable between an upright position and a forward folded position to permit ingress and egress to the area behind the seat back.

A seat back lock assembly 15 is provided and is operable to permit normal swinging movement except upon rapid deceleration or impact when it functions to lock the seat back against forward swinging movement. A shoulder belt lock assembly 16 is provided on the seat back and includes a slide 17 having a loop 17a to which the shoulder belt may be attached. The assembly 16 is operable to permit vertical movement of the slide 17 to accommodate normal movement of the occupant of the seat except upon relative rapid movement of the occupant when the assembly 16 functions to lock the slide 17 against upward movement with respect to the seat back.

Referring to FIGS. 3–8, the seat back lock assembly 15 comprises a housing 20 made of sheet metal and mounted on the bottom member 13 with its major cross-sectional dimension extending fore and aft of the vehicle. Housing 20 includes an outer U-shaped housing member 21 and inner telescoping U-shaped housing member 22 that are telescoped and joined together to form a tubular construction. Indentations 23 extend into openings 24 to lock the members 21, 22 together. A spacer 25 within the inner member 22 functions in cooperation with the base 26 to define a slideway or track 27. A portion of the spacer 25 is cut away as at 28 and a pawl 29 is pivoted by a transverse pin 30 for movement in the space 25. Pawl 29 extends generally vertically and has the major portion of its weight above the pin 30 so that the upper end 31 is counterweighted so that in seated upright position the greatest mass is rearward of its pivot to urge the upper end of the pawl 29 rearwardly.

A ratchet 33 is slidable in track 27 and includes spaced recesses 34, 35 that face downwardly and rearwardly when the seat back is in upright position. As shown in FIG. 6, the ratchet 33 is generally U-shaped in cross section and the recesses 34, 35 are formed in the legs of the ratchet 33 while the base 36 of the ratchet slides along the inner surface of the base 26 of the outer member 21 of the housing. A link 37 is pivotally interconnected at its upper end by a pin 38 between the legs of the ratchet 33 and at its lower end by a pin 39 to the legs of a mounting bracket 40 that is fixed to the rear tube 41 of the seat base 14. A plastic cap 42 closes the upper end of the housing and serves as a dust cap. Mounting plates 43 are provided on the exterior of the legs of the outer housing member 21 to mount the lock assembly. A roll pin 44 is provided on the upper end of the ratchet 33 and extends into slots 45 in the legs of the member 21 to guide the vertical movement and extent of movement of the ratchet 33.

In normal operation of the seat back including movement between an upright and a forward folded position, the upper end 31 of the pawl 29 remains out of engagement with any portion of the ratchet as shown in FIG. 7. However, upon rapid deceleration as in the case of an accident or hard braking, the upper end 31 of pawl 29 extends into one of the recesses 34, 35 as shown in FIG. 8 to lock the seat back against forward movement.

Referring to FIGS. 1, 2 and 9, the shoulder strap assembly 16 comprises a one-piece housing or case 50 that is made of sheet metal and includes spaced walls 51, an integral end wall 52. The free longitudinal edges 53 of the walls 51 are bent inwardly and abut one another so that the inner surface of the integral wall 52, the free edges of the portions 53 and the walls 51 define a track in which slides 17 function. The inner edges of the portions 53 are formed with longitudinally spaced teeth 54 that extend downwardly. A portion of the slide is cut away as at 55. A pawl 56 having bifurcated ends is provided in the space 55. The lower bifurcated end 57 straddles the slide 17 and is pivoted to the slide by a pin 58 while the upper bifurcated end 59 straddles the slide adjacent the teeth. A spring 60 yieldingly holds the upper end of pawl 56 out of the path of the teeth. The walls 51 are cut away at the area of the pawl and teeth and the thickness of the pawl is substantially equal to the distance between the outer surfaces of walls 51.

Upon normal movement of the slide 17, as when the occupant is manipulating the various items in the vehicle, the slide moves freely. However, upon rapid movement of the slide, the inertia of the pawl 56 causes the pawl 56 to pivot into the path of the teeth 54 thereby engaging one of the teeth to lock the slide 17 and in turn the shoulder belt with respect to the seat back.

I claim:

1. The combination comprising
   a seat base,
   a seat back mounted for swinging movement with respect to the seat base between a generally upright position and a forward folded position to permit egress and ingress of persons to the area behind the seat,
   a seat back lock assembly mounted on the seat back and connected to the seat base operable upon normal swinging movement of the seat back from upright to forward position and operable to lock the seat mechanically upon sudden deceleration of the vehicle,
   and a shoulder strap assembly mounted on the seat back,
   said shoulder belt assembly including a slide to which a shoulder belt may be connected,
   and means operable to permit normal movement of the slide with respect to the seat back,
   said means being operable upon rapid movement of the slide with respect to the seat back to lock the slide with respect to the seat back and therefore lock the shoulder belt,
   said seat back lack assembly comprising a pawl pivoted to the seat back for movement about a transverse axis,
   means defining a track adjacent said pawl,
   a ratchet movable along said track and having recesses which face downwardly and rearwardly when the seat back is in upright position adapted to be engaged by said pawl,
   means interconnecting the ratchet to the base,
   and means pivoting the pawl to the back in a manner such that the pawl pivots forwardly into engagement with a recess upon rapid deceleration of the vehicle but is held out of engagement with the recesses during normal swinging movement of the seat back between upright and forward positions,
   said pawl being pivoted in a manner such that the upper end thereof is counterweighted so that its greater mass is rearward of its pivot when the seat back is in upright position,
   whereby when the seat back is subjected to rapid deceleration the upper end of the pawl moves forwardly toward recess engaging position to engage the ratchet and lock the seat back against forward movement.

2. The combination comprising
   a seat base,
   a seat back mounted for swinging movement with respect to the seat base between a generally upright position and a forward folded position to permit egress and ingress of persons to the area behind the seat,
   a seat back lock assembly mounted on the seat back and connected to the seat base operable upon normal swinging movement of the seat back from upright to forward position and operable to lock the seat mechanically upon sudden deceleration of the vehicle,
   and a shoulder strap assembly mounted on the seat back,
   said shoulder belt assembly including a slide to which a shoulder belt may be connected,
   and means operable to permit normal movement of the slide with respect to the seat back,
   said means being operable upon rapid movement of the slide with respect to the seat back to lock the slide with respect to the seat back and therefore lock the shoulder belt,
   said seat back lock assembly comprising a pawl pivoted to the seat back for movement about a transverse axis,
   means defining a track adjacent said pawl,
   a ratchet movable along said track and having recesses which face downwardly and rearwardly when the seat back is in upright position adapted to be engaged by said pawl,
   means interconnecting the ratchet to the base,
   and means pivoting the pawl to the back in a manner such that the pawl pivots forwardly into engagement with a recess upon rapid deceleration of the vehicle but is held out of engagement with the recesses during normal swinging movement of the seat back between upright and forward positions,
   said means defining a track comprising a housing,
   said housing comprising generally U-shaped longitudinally extending members telescoped one within the other,
   the free edges of the inner member cooperating with the base of the outer member to define the track,
   said ratchet comprising a member that is generally U-shaped in cross section,
   the base of said ratchet member engaging the base of said outer housing member,
   said recesses of said ratchet being formed in the legs of said ratchet member.

3. The combination set forth in claim 2 including mounting plates along the outer surfaces of the legs of the outer housing member.

4. The combination set forth in claim 2 wherein said means pivotally interconnecting the ratchet to the base comprises a link having one end thereof pivoted intermediate the legs of the ratchet member and the other end thereof pivoted to said base.

5. The combination set forth in claim 2 including guide means for guiding the longitudinal extent of movement of the ratchet with respect to the base.

6. The combination comprising
   a seat base,
   a seat back mounted for swinging movement with respect to the seat base between a generally upright position and a forward folded position to permit egress and ingress of persons to the area behind the seat,
   a seat back lock assembly mounted on the seat back and connected to the seat base operable upon normal swinging movement of the seat back from upright to forward position and operable to lock the seat mechanically upon sudden deceleration of the vehicle,
   and a shoulder strap assembly mounted on the seat back,
   said shoulder belt assembly including a slide to which a shoulder belt may be connected,
   and means operable to permit normal movement of the slide with respect to the seat back,
   said means being operable upon rapid movement of the slide with respect to the seat back to lock the slide with respect to the seat back and therefore lock the shoulder belt,
   said shoulder strap assembly comprising a housing attached to the seat back and defining a track,
   said housing having a plurality of longitudinally spaced teeth thereon,
   said teeth facing downwardly with respect to the seat back when the seat back is in upright position,
   said slide being slidable in said track,
   and a pawl mounted on said slide for movement toward said teeth upon sudden application of force on said slide,
   said pawl normally being out of the path of said teeth,
   said housing of said shoulder strap lock assembly being generally rectangular in cross section and including spaced walls, an interconnected integral end wall, and inwardly turned flanges along the other edges of said spaced walls extending inwardly to define a track for the slide, said teeth being formed on the inwardly extending flanges.

7. The combination set forth in claim 6 wherein said pawl includes bifurcated ends,
said bifurcated end straddling and being pivoted to said slide,
the other bifurcated end straddling the slide and operable to engage said teeth,
said slide having an opening therein to which the intermediate portion of said pawl extends,
and a spring yieldingly urging said other bifurcated end of said pawl away from said teeth.

8. The combination set forth in claim 7 wherein said walls of said housing are cut away at the area of said pawl and the thickness of said pawl and the distance between the outer surfaces of said walls of said housing are substantially equal.

9. The combination comprising
a seat base,
a seat back mounted for swinging movement with respect to the seat base between a generally upright position and a forward folded position to permit egress and ingress of persons to the area behind the seat,
a seat back lock assembly operable upon normal swinging movement of the seat back from upright to forward position and operable to lock the seat mechanically upon sudden impact of the vehicle,
said seat back lock assembly comprising a pawl pivoted to the seat back for movement about a transverse axis,
means defining a track adjacent said pawl,
a ratchet movable along said track and having downwardly facing recesses which face downwardly and rearwardly when the seat back is in upright position adapted to be engaged by said pawl,
means interconnecting the ratchet to the base,
and means pivoting the pawl to the back in a manner such that the pawl pivots forwardly into engagement with a recess upon rapid deceleration or impact on the vehicle but is held out of engagement with the recesses during normal swinging movement of the seat back between upright and forward position,
said pawl being pivoted in a manner such that the upper end thereof is counterweighted to urge the upper end of the pawl rearwardly out of recess engaging position,
whereby when the seat back is subjected to deceleration or impact the upper end of the pawl moves forwardly toward recess engaging position to engage the ratchet and lock the seat back against forward movement.

10. The combination comprising
a seat base,
a seat back mounted for swinging movement with respect to the seat base between a generally upright position and a forward folded position to permit egress and ingress of persons to the area behind the seat,
a seat back lock assembly operable upon normal swinging movement of the seat back from upright to forward position and operable to lock the seat mechanically upon sudden impact on the vehicle,
said seat back lock assembly comprising a pawl pivoted to the seat back for movement about a transverse axis,
means defining a track adjacent said pawl,
a ratchet movable along said track and having downwardly facing recesses which face downwardly and rearwardly when the seat back is in upright position adapted to be engaged by said pawl,
means interconnecting the ratchet to the base,
and means pivoting the pawl to the back in a manner such that the pawl pivots forwardly into engagement with a recess upon rapid deceleration or impact on the vehicle but is held out of engagement with the recesses during normal swinging movement of the seat back between upright and forward position,
said means defining a track comprising a housing,
said housing comprising generally U-shaped longitudinally extending members telescoped one within the other,
the free edges of the inner member cooperating with the base of the outer member to define the track,
said ratchet comprising a member that is generally U-shaped in cross section,
the base of said ratchet member engaging the base of said outer housing member,
said recesses of said ratchet being formed in the legs of said ratchet member.

11. The combination set forth in claim 10 including mounting plates along the outer surfaces of the legs of the outer housing member.

12. The combination set forth in claim 10 wherein said means pivotally interconnecting the ratchet to the base comprises a link having one end thereof pivoted intermediate the legs of the ratchet member and the other end thereof pivoted to said base.

13. The combination comprising
a seat base,
a seat back mounted on the base,
and a shoulder strap assembly mounted on the seat back,
said shoulder strap assembly comprising a housing attached to the seat back and defining a track,
said housing having a plurality of longitudinally spaced teeth thereon,
said teeth facing downwardly with respect to the seat back,
a slide in said track to which said shoulder belt may be attached,
and a pawl mounted on said slide for movement toward said teeth upon sudden application of force on said slide,
said pawl normally being out of the path of said teeth,
said housing of said shoulder strap lock assembly being generally rectangular in cross section and including spaced walls, an interconnected integral end wall, and inwardly turned flanges along the other edges of said spaced walls extending inwardly to define a track for the slide,
said teeth being formed on the inwardly extending flanges,
said pawl including bifurcated ends,
one said bifurcated end straddling and being pivoted to said slide,
the other said bifurcated end straddling the slide,
said slide having an opening therein to which the intermediate portion of said pawl extends,
and a spring yieldingly urging said other bifurcated end of said pawl away from said teeth,
said walls of said housing being cut away at the area of said pawl and the thickness of said pawl and the distance between the outer surfaces of said walls of said housing are substantially equal.

14. An impact responsive lock assembly comprising
a slide to which a belt may be attached,
a housing which is generally rectangular in cross section and includes spaced walls, an interconnected integral end wall, and inwardly turned flanges along the other edges of said spaced walls extending inwardly to define a track for the slide,
longitudinally spaced teeth formed on the inwardly extending flanges,
a pawl including bifurcated ends,
one said bifurcated end straddling and being pivoted to said slide,
the other said bifurcated end straddling the slide,
said slide having an opening therein to which the intermediate portion of said pawl extends,
and a spring yieldingly urging said other bifurcated end of said pawl away from said teeth.

15. The combination set forth in claim 14 wherein said walls of said housing are cut away at the area of said pawl and the thickness of said pawl and the distance between the outer surfaces of said walls of said housing are substantially equal.

* * * * *